Nov. 12, 1935.   C. A. FLANAGAN   2,020,827
TRIANGULAR PRISM SHAPED TIN
Filed Jan. 30, 1932
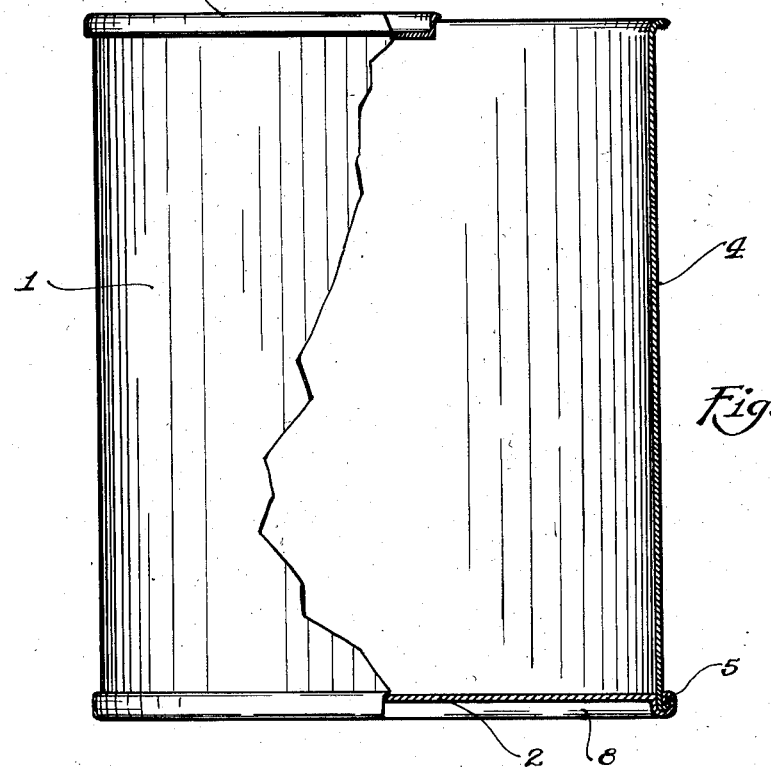
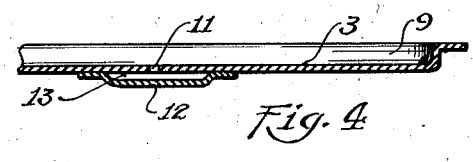
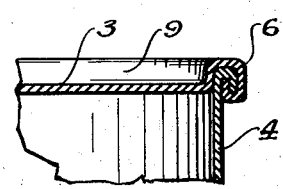
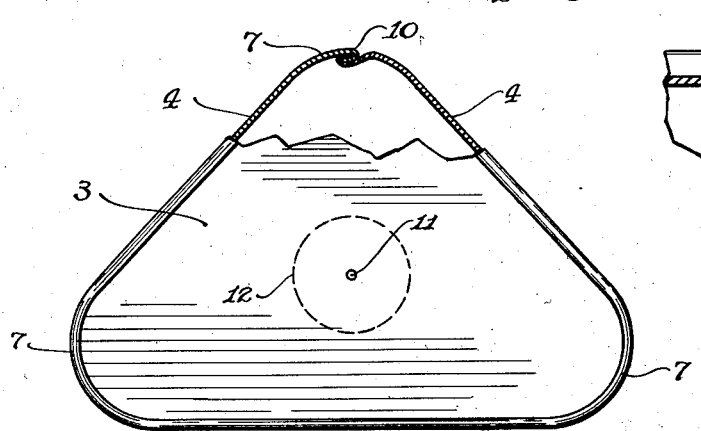
Charles A. Flanagan
INVENTOR Patented Nov. 12, 1935

2,020,827

UNITED STATES PATENT OFFICE 2,020,827

TRIANGULAR PRISM SHAPED TIN

Charles A. Flanagan, Chicago, Ill., assignor to Swift and Company, Chicago, Ill., a corporation of Illinois Application January 30, 1932, Serial No. 589,802

3 Claims. (Cl. 220—1)

The invention relates to a triangular prism shaped tin for processing and packing meat products, the method in which the tin is employed forming the subject matter of a separate co-pending application filed February 8, 1932, Serial Number 591,732.

The object of the present invention is to provide a tin or receptacle for processing and packing meat adapted to afford a quicker and more uniform heat penetration and a more uniform processing or cooking of the meat product and a more convenient and economical slicing of the meat product as two slices of the finished tinned meat product will exactly fit a square sandwich loaf piece of bread.

A further object of the invention is to provide a tin having plane flat sides capable, during the processing of the meat product, of collapsing inwardly to a limited degree for more firmly packing the meat product within the tin and to expel and effectually exclude air from the packed meat product by such completely filling the tin with the same so that when the tin is sealed the condition of the meat product will remain unchanged.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing:

Figure 1 is a side elevation partly in section of the body portion of a triangular prism shaped tin constructed in accordance with this invention.

Fig. 2 is a plan view of the prism shaped tin partly in section.

Fig. 3 is an enlarged detail sectional view illustrating the manner of securing the top of the tin to the side walls of the same.

Fig. 4 is a detail sectional view of a portion of the top of the tin.

In the accompanying drawing in which is illustrated the preferred embodiment of the invention, I designates a substantially triangular prism shaped tin for processing and packing ham and other meat products. The tin or receptacle I has a substantially triangular bottom 2 and a substantially triangular top 3 which are secured at their marginal edges to the vertical side walls 4 of the tin by lower and upper seams 5 and 6.

The tin is provided with rounded corners 7 and the sides 4 are straight, flat or plane sides. The rounded corners 7 are broadly curved and form blunt corners in the meat product so that the latter may be sliced as thin as desired without liability of breaking the corners and spoiling the appearance of the slices and wasting the material which might result if sharp or relatively narrow corners were formed in the meat product. The bottom is inset by means of a substantially L-shaped marginal flange 8 which is bent around the lower edges of the vertical walls 4 and interlocked with the same to form the said bottom seam 5.

The top 3 is provided with a marginal flange 9 which is substantially L-shaped in cross section and which is bent around the upper edges of the side walls of the tin and interlocked with the same to form the said upper seam 6. This marginal flange 9 insets the top 3 below the plane of the upper edges of the side walls of the tin, as clearly illustrated in Fig. 3 of the drawing. The side walls of the tin are preferably constructed of a single piece of sheet metal united at one of the rounded corners by a vertical seam 10, as clearly illustrated in Fig. 2 of the drawing. In the processing of the meat as described and claimed in the aforesaid application, the meat is first pressed into a square or oblong prism shape with slightly rounded corners so that there is a proper distribution of the component muscles of the meat product. The pressed meat is then placed in a mitre box and is cut diagonally into two triangular prism shaped pieces of a cross-sectional size to fit triangular prism shaped tins constructed in accordance with the present invention. It will be understood, of course, that meat may be pressed in a triangular prism shape in the first instance.

The triangular prism shaped pieces are then packed in triangular prism shaped tins and the top 3 is then placed on each tin and secured by means of the seam 6. The top 3 is provided with a central perforation 11 for the escape of air steam and other vapor during the processing or cooking of the meat which is done while the same is packed in the triangular prism shaped tin 1. The top is also provided at its lower face with a shield 12 preferably consisting of a disk dished at the central portion and having a flat peripheral portion fitted against and secured to the lower face of the top and forming an intervening space 13 between the top and the shield.

The space 13 communicates with the interior of the tin and with the perforation 11 preferably by having portions of the periphery of the shield out of contact with the lower face of the top 3. The shield prevents the perforation 11 from becoming clogged with particles both in the processing or cooking of the meat and when chilling the same.

The processed meat product is chilled in the triangular prism shaped tin while the same is vacuum drawn or exhausted and the exhausting of the tin results in a collapsing of the side walls of the tin and a compressible effect on the filled product so that the tin is more firmly and completely packed and air expelled and entirely excluded therefrom so that when the tin is sealed the meat will remain unchanged in its packed and processed condition for an indefinite period of time.

Upon application of the vacuum, the corners 7, being of flexible material and broadly curved, will serve as resilient anchors with respect to the collapsing of straight flat side walls 4, that is, walls 4 will substantially uniformly move inwardly due to the resiliency of corners 7, the corners 7, of course, becoming slightly narrowed.

The meat pressed, cut, processed and packed in this manner provides for a proper distribution of the various muscles of the meat and for more convenient and economical slicing of the finished product, two slices of which will exactly fit a square sandwich loaf piece of bread. Also the triangular form of the tin has the advantage of providing flat panels for labels and provides a longer or taller can which may be more economically packed in boxes and arranged on shelves for the display of the goods; also the triangular shape allows for a quicker and more uniform heat penetration and consequently a more uniform processing of the meat.

What is claimed is:

1. A triangular prism shaped tin adapted for processing and packing meat products, comprising a flat bottom and top and straight flat side walls, said tin being characterized in that it has broadly curved corner portions adjoining the several walls, the curvature and flexibility of said corner portions constituting means for permitting said walls to substantially uniformly collapse inwardly under atmospheric pressure when the tin is vacuumized.

2. A triangular prism shaped tin adapted for processing and packing meat products, comprising a substantially flat bottom and top and straight flat side walls, said tin being characterized in that it has broadly curved flexible corner portions adjoining the several walls, which broadly curved corner portions serve as resilient anchors with respect to said walls and thereby permit said walls to substantially uniformly collapse inwardly under atmospheric pressure when the tin is vacuumized.

3. A triangular prism shaped tin adapted for processing and packing meat products, comprising a bottom, a top, and straight flat side walls, said top having a perforation for subjecting the contents of the tin to a vacuum action, and a shield carried on the lower face of the top to prevent the contents of the tin from clogging the perforation, said tin being characterized in that it has broadly curved corner portions adjoining the several walls, the curvature and flexibility of said corner portions constituting means for permitting said walls to substantially uniformly collapse inwardly under atmospheric pressure when the tin is vacuumized.

CHARLES A. FLANAGAN.